US007490908B2

(12) United States Patent
Wieclawski

(10) Patent No.: US 7,490,908 B2
(45) Date of Patent: Feb. 17, 2009

(54) INTEGRATED LATCH ASSEMBLY

(75) Inventor: Stanislaw Andrzej Wieclawski, Riedstadt (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 11/773,014

(22) Filed: Jul. 3, 2007

(65) Prior Publication Data
US 2009/0008981 A1    Jan. 8, 2009

(51) Int. Cl.
*B60N 2/20* (2006.01)

(52) U.S. Cl. ............... 297/378.13; 297/336; 296/65.17

(58) Field of Classification Search ............... 297/336, 297/378.12, 378.13; 296/65.03, 65.16, 65.17; 248/503.1
See application file for complete search history.

(56) References Cited

U.S. PATENT DOCUMENTS

| | | | | |
|---|---|---|---|---|
| 4,607,884 A | | 8/1986 | Heling | |
| 4,634,180 A | | 1/1987 | Zaveri et al. | |
| 4,639,040 A | * | 1/1987 | Fujita et al. | 297/378.13 |
| 4,720,143 A | * | 1/1988 | Schwartz et al. | 297/326 |
| 4,721,338 A | * | 1/1988 | Kondo | 297/378.13 |
| 4,736,985 A | * | 4/1988 | Fourrey et al. | 297/331 |
| 4,866,820 A | * | 9/1989 | Hassmann | 24/628 |
| 4,881,767 A | * | 11/1989 | Kondo | 292/224 |
| 5,662,369 A | * | 9/1997 | Tsuge | 296/66 |
| 5,762,401 A | * | 6/1998 | Bernard | 297/378.13 |
| 6,302,484 B1 | * | 10/2001 | Araki et al. | 297/378.12 |
| 6,345,856 B1 | * | 2/2002 | Minai | 296/65.03 |
| 6,595,587 B2 | * | 7/2003 | Konishi et al. | 297/331 |
| 6,733,078 B1 | * | 5/2004 | Zelmanov | 297/378.1 |
| 6,860,565 B2 | | 3/2005 | Spence, Jr. | |
| 6,945,585 B1 | | 9/2005 | Liu et al. | |
| 7,032,973 B2 | * | 4/2006 | Reubeuze | 297/378.13 |
| 7,044,552 B2 | * | 5/2006 | Muller et al. | 297/336 |
| 7,264,293 B2 | * | 9/2007 | Fischer et al. | 296/65.03 |
| 2006/0170270 A1 | * | 8/2006 | Inoue et al. | 297/378.12 |
| 2007/0090670 A1 | * | 4/2007 | Garland | 297/285 |

* cited by examiner

*Primary Examiner*—David Dunn
*Assistant Examiner*—Patrick Lynch
(74) *Attorney, Agent, or Firm*—Brooks Kushman P.C.

(57) ABSTRACT

A vehicle seat assembly attachable to a vehicle having a striker member is provided having a seat frame configured for connection to the vehicle. A portion of the seat frame may be configured to move between a first seat position and a second seat position. A hook member may be mounted directly to the seat frame. The hook member may have a protrusion and may be configured for movement between a latched position and an unlatched position. The hook member may engage the striker member when the portion of the seat frame is in the first seat position and the hook member is in the latched position. The protrusion and the striker member may cooperate to restrain the seat frame in the first seat position when member engages the striker member. The hook member may be disengaged from the striker member when the hook member is in the unlatched position.

14 Claims, 4 Drawing Sheets

INTEGRATED LATCH ASSEMBLY

BACKGROUND OF THE INVENTION

1. Field of the Invention

The field of this invention is latch assemblies for seats.

2. Background Art

Seat assemblies, including automotive seats, are commonly configured to move between a first position and a second position. In some embodiments, the entire seat assembly may move. In other embodiments, only a portion of the seat assembly may move from the first position to the second position. Such reconfigurability can, for example, permit a seat back to be folded flat to increase a cargo load floor in a vehicle.

Latch assemblies are used to secure and release the seat assembly but are accessible only from a position that is either forward of, or rearward of, the seat assembly. Additionally, latch assemblies are housed in separate housings which must be attached to the seat assembly. The use of a housing to mount a latch assembly to the seat assembly can add cost and complexity to the seat assembly. These and other problems are addressed by the present invention.

SUMMARY OF THE INVENTION

In at least a first embodiment, a vehicle seat assembly that is configured to engage a striker member that is disposed on a vehicle is provided. The vehicle seat assembly comprises a seat frame, a portion of which is configured to move between a first position and a second position. The vehicle seat assembly further comprises a hook member mounted directly to the seat frame. The hook member may be configured to move between a latched position and an unlatched position. The hook member may engage the striker member when the portion of the seat frame is in the first seat position and the hook member is in the latched position. The hook member and the striker member may cooperate to restrain the portion of the seat frame in the first seat position when the hook member engages the striker member.

In at least one implementation of the first embodiment, the vehicle seat assembly further comprises a first actuator and a second actuator. The first actuator and the second actuator may each be disposed proximate the hook member. Each actuator may be configured to move the hook member from the latched position to the unlatched position. The first actuator may be accessible from the position forward of the seat frame. The second actuator may be accessible from the position rearward of the seat frame.

In at least one variation of this implementation, the hook member may include a first surface and a second surface. The hook member may move from the latched position to the unlatched position when a force is applied to either the first surface or to the second surface or to a combination of the first and second surfaces. The first actuator may be configured to apply force to the first surface when actuated. The second actuator may be configured to apply force to the second surface when actuated. In a further variation of this implementation, the second actuator may be a release lever configured to move between a neutral position and an actuation position. In some variations, the release lever may be mounted to the striker member. In other variations, the vehicle seat may further comprise a linking member that is connected to the release lever. The linking member may be configured to remotely move the release lever towards the actuation position when a force is applied to the linking member.

In at least another implementation of the first embodiment, the vehicle seat assembly may further comprise a spring supported on the seat frame and connected to the hook member. The spring may urge the hook member to remain in the latched position when the hook member is in the latched position and the spring may urge the hook member to remain in the unlatched position when the hook member is in the unlatched position. In at least one variation of this implementation, the striker member may flex a portion of the spring when the hook member engages the striker member. The portion of the spring may be at least partially relaxed when the hook member is disengaged from the striker member. In a variation of this implementation, the spring may urge the hook member to remain in the latched position when the portion of the spring is flexed. The spring may also urge the hook member to remain in the unlatched position when the portion of the spring is at least partially relaxed. In further variations, the portion of the spring may be a first spring portion that has a first coil that is coiled in a first direction. The spring may also have a second spring portion that has a second coil that is coiled in a second direction. The first spring portion may bias the second spring portion in a first direction that causes the second spring portion to urge the hook member towards the latched position when the first spring is flexed. In a still further variation of this implementation, the first spring portion may bias the second spring portion in a second direction that may cause the second spring portion to urge the hook member towards the unlatched position when the first spring portion is at least partially relaxed.

In at least another implementation of the first embodiment, the vehicle seat may further comprise a spring that is supported on the seat frame and connected to the hook member. The spring may urge the hook member to remain in the latched position when the hook member is in the latched position and the spring may urge the hook member to remain in the unlatched position when the hook member is in the unlatched position. The vehicle seat assembly may further comprise a lever member that is pivotally supported on the seat frame proximate the spring. The lever member may be configured to move between a first lever member position and a second lever member position. The lever member may be moved into the first lever member position by the striker member as the portion of the seat frame moves into the first seat position. The lever member may cause the portion of the spring to flex as the lever member moves into the first lever member position. The lever member may be moved into the second lever member position by the portion of the spring when the portion of the spring is at least partially relaxed. In at least one variation of this implementation, the vehicle seat assembly may further comprise a pivot member that is attached to the seat frame. The lever member may be pivotally supported on the seat frame by the pivot member. The spring may have first and second coiled portions, and the second coiled portion may be coiled around the pivot member.

In at least a second embodiment, a vehicle seat assembly that is configured to engage a striker member that is disposed on a vehicle is provided. The vehicle seat assembly comprises a seat frame that is configured for connection to the vehicle. A portion of the seat frame may be configured to move between a first seat position and a second seat position. The seat frame may have a double wall construction including a first wall and a second wall. The vehicle seat assembly may further comprise a hook member that may be mounted directly to the seat frame between the first wall and the second wall. The hook member may have a protrusion and may be configured for movement between a latched position and an unlatched position. The hook member may engage the striker member when the portion of the seat frame is in the first position and the hook member is in the latched position. The protrusion and the striker member may cooperate to restrain the portion of the seat frame in the first seat position when the hook member engages the striker member. The hook member may be disengaged from the striker member when the hook member is in the unlatched position. The hook member may include a first ledge and a second ledge. The hook member may move from the latched position to the unlatched position when a force is applied to either the first ledge or to the second ledge or to a combination of the first and second ledges.

In at least one implementation of the second embodiment, the vehicle seat assembly further comprises a release lever that may be attached to the vehicle proximate the striker member. The release lever may be configured to move between a neutral position and an actuation position. The release lever may apply a force to the second ledge when the release lever moves to the actuation position. In at least one variation of this implementation, the vehicle seat assembly further comprises a linking member that may be connected to the release lever. The linking member may include a cable to remotely move the release lever toward the actuation position when a force is applied to the linking member.

In at least a third embodiment, a vehicle seat assembly that is configured to engage a striker member disposed on a vehicle is provided. The vehicle assembly may comprise a seat frame that is configured for connection to the vehicle. A portion of the seat frame may be configured to move between a first seat position and a second seat position. The seat frame may have a double wall construction that includes a first wall and a second wall. The vehicle seat assembly further comprises a hook member that may be mounted directly to the seat frame between the first wall and the second wall. The hook member may have a protrusion and may be configured for movement between a latched position and an unlatched position. The hook member may engage the striker member when the portion of the seat frame is in the first seat position and the hook member is in the latched position. The protrusion and the striker member may cooperate to restrain the portion of the seat frame in the first seat position when the hook member engages the striker member. The hook member may be disengaged from the striker member when the hook member is in the unlatched position. The hook member may include a first ledge and a second ledge. The hook member may move from the latched position to the unlatched position when a force is applied to at least one of the first and second ledges. The hook member may be mounted to the seat frame such that the first ledge is accessible to a user from a position forward of the seat frame and the second ledge may be accessible to a user from a position rearward of the seat frame. The vehicle seat assembly may further comprise a spring that may be supported on the seat frame and connected to the hook member. The spring may urge the hook member to remain in the latched position when the hook member is in the latched position. The spring may also urge the hook member to remain in the unlatched position when the hook member is in the unlatched position.

In at least one implementation of the third embodiment, the striker member may flex a portion of the spring when the hook member engages the striker member. The portion of the spring may be at least partially relaxed when the hook member is disengaged from the striker member. The spring may urge the hook member to remain in the latched position when the portion of the spring is flexed. The spring may urge the hook member to remain in the unlatched position when the portion of the spring is at least partially relaxed.

In at least one variation of this implementation, the portion of the spring is a first spring portion. The first spring portion may have a first coil that is coiled in a first direction. The spring may have a second spring portion that has a second coil that is coiled in a second direction. The first spring portion may bias the second spring portion in a first direction that causes the second spring portion to urge the hook member towards the latched position when the first spring portion is flexed. The first spring portion may bias the second spring portion in a second direction that causes the second spring portion to urge the hook member towards the unlatched position when the first spring portion is at least partially relaxed.

In at least a further variation, the vehicle seat assembly further comprises a pivot member that may be attached to the seat frame and a lever member that may be pivotally supported by the pivot member. The lever member may be configured to move between a first lever member position and a second lever member position. The lever member may be moved into the first lever member position by the striker member as the portion of the seat frame moves into the first seat position. The lever member may flex the portion of the spring as the lever member moves into the first lever member position. The lever member may be moved into the second lever member position by the spring when the portion of the spring is at least partially relaxed. The spring may have a first coil that is coiled around the pivot member. The spring may further have a second coil that is in contact with the lever member.

DETAILED DESCRIPTION OF THE ILLUSTRATED EMBODIMENT(S)

Detailed embodiments of the present invention are disclosed herein; however, it is to be understood that the disclosed embodiments are merely exemplary of the invention that may be embodied in various and alternative forms. The figures are not necessarily drawn to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
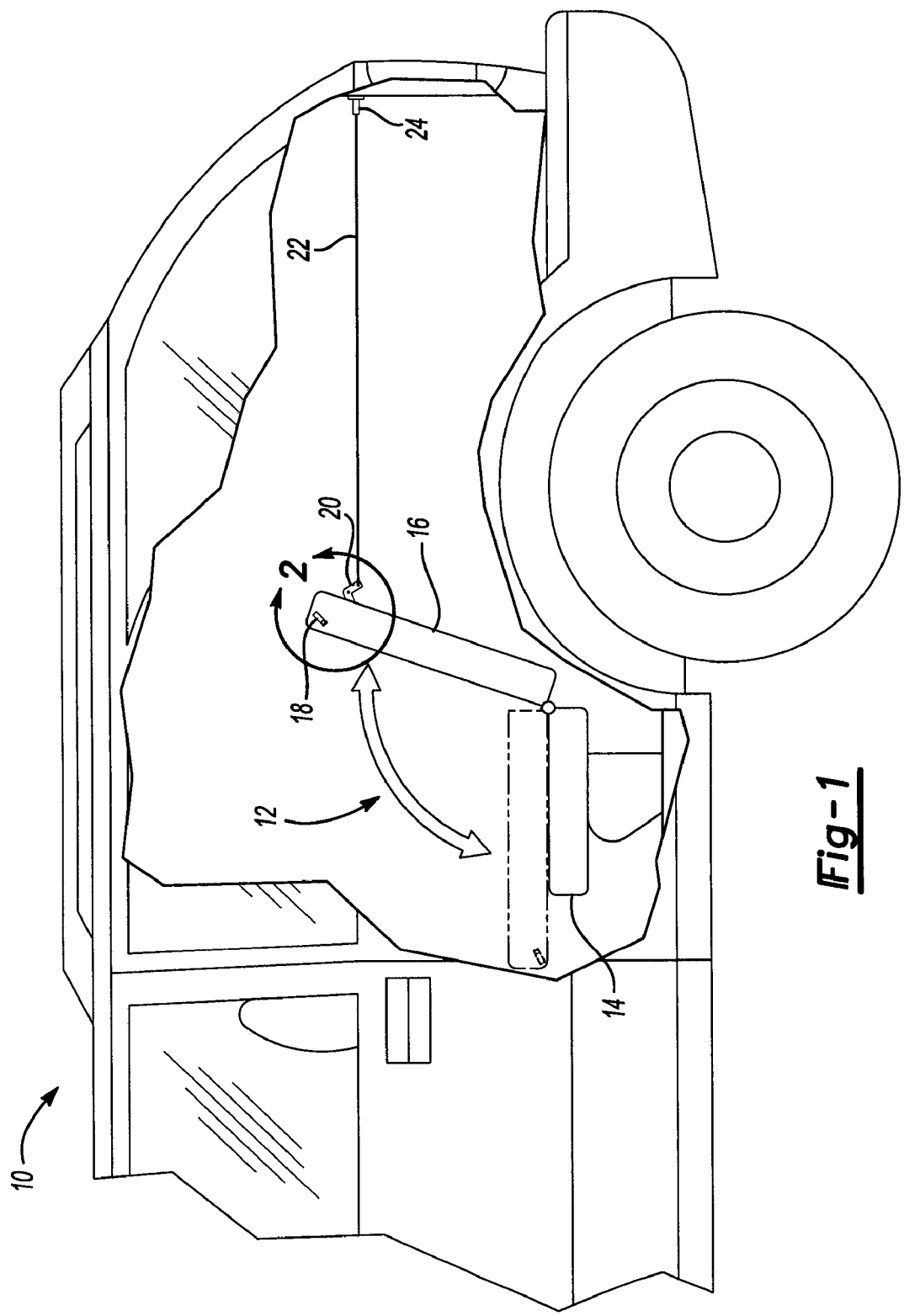
FIG. 1 is a cut-away side elevational view of a vehicle equipped with an embodiment of a vehicle seat assembly of the present invention.

FIG. 1 illustrates a vehicle 10 equipped with an embodiment of a vehicle seat assembly 12 of the present invention. Although vehicle 10 is illustrated as an automobile, it should be understood by those of ordinary skill in the art that the illustrated vehicle seat assembly may be utilized with all types of vehicles including, but not limited to, aircraft, spacecraft, water craft, and land craft of all sorts including automobiles and vehicles which operate on rails.

A portion of the vehicle 10 has been fragmented away to reveal vehicle seat assembly 12. Vehicle seat assembly 12 includes a seat bottom 14 and a seat back 16. Seat back 16 is configured to pivot between a substantially upright position and a folded position wherein seat back 16 is substantially adjacent to seat bottom 14, as illustrated in phantom lines in FIG. 1.

Vehicle seat assembly 12 includes a first actuator 18 and a second actuator 20. The first and second actuators 18 and 20 are configured to unlatch seat back 16 which is then free to pivot to the folded position. First actuator 18 is accessible to a person standing forward of vehicle seat assembly 12 such as a passenger standing beside vehicle 10. Second actuator 20 is accessible to an operator positioned rearward of vehicle seat assembly 12, such as an operator positioned within a cargo portion of vehicle 10. In some embodiments, such as that illustrated in FIG. 1, a linking member 22 may connect the second actuator 20 to a remote portion of vehicle 10, such as a portion located adjacent a door or rear cargo hatch. An operator standing outside of vehicle 10 proximate the rear hatch need only pull handle 24 to remotely unlatch seat back 16 which may then be folded flat to provide additional cargo storage space.

Figure 2:
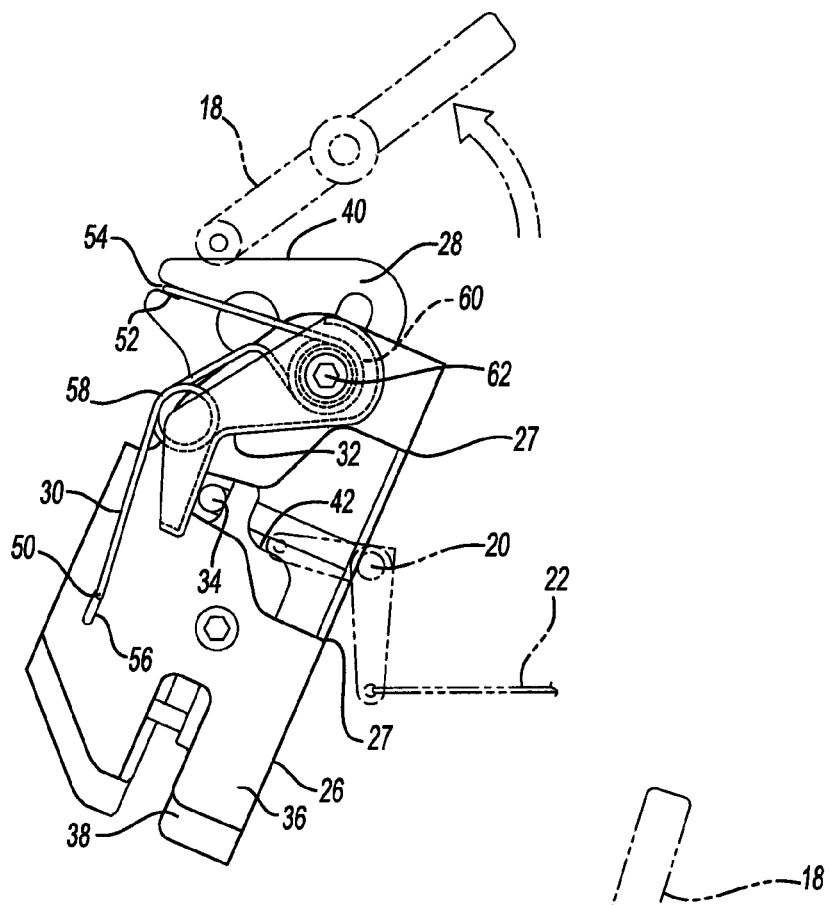
FIG. 2 is a fragmented side elevational cut-away view of the portion of the vehicle seat assembly circled in FIG. 1 in a latched configuration.
Figure 3:
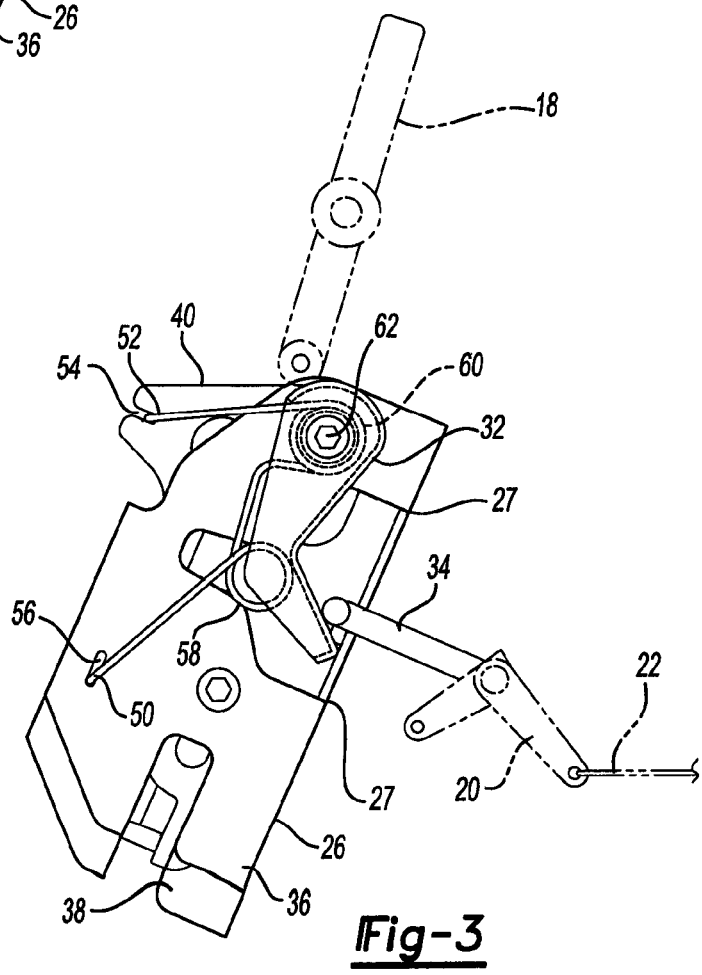
FIG. 3 is a fragmented cut-away view of the portion of the vehicle seat assembly of FIG. 2 in an unlatched configuration.

FIG. 2 is a fragmented, cutaway view of the portion of seat back 16 circled in FIG. 1. In this view, the seat frame 26 and its integrated latch system are illustrated. The integrated latch system includes a hook member 28, a spring 30, and a lever member 32. The seat frame 26 and the latch system engage striker member 34 which is affixed to a portion of vehicle 10. When seat back 16 pivots from the folded position to the upright position, the latch system docks with, and latches to, striker member 34. In FIG. 2, the seat back 16 is latched to striker member 34. FIG. 3 shows seat back 16 in an unlatched state.

The latch system is directly mounted to, or integrated with, seat frame 26. In this regard, while fasteners or other structures may be used to connect hook member 28 to seat frame 26, a separate housing for hook member 28 and the other components of the latch system is not used. Seat frame 26 has a double wall construction, including a first wall 36 and a second wall 38 spaced apart from first wall 36, to permit integration of the latch system into seat frame 26, though other configurations may also be utilized. In some embodiments, the seat frame 26 may have a double wall construction throughout its entire length. In other embodiments, the double wall construction may be utilized only at a location where the latch assembly is to be integrated into seat frame 26. Seat frame 26 includes an inlet 27 to permit engagement of the latch system with striker member 34.

Hook member 28 is configured to be disposed between the first and second walls 36, 38 of seat frame 26 and is further configured to slide between a latched position (as illustrated in FIG. 2) and an unlatched position (as illustrated in FIG. 3). In the illustrated embodiment, hook member 28 is configured to slide between the latched and unlatched position. In other embodiments, hook member 28 may rotate, swing, pivot or otherwise move between the latched and unlatched position.

Figure 4:
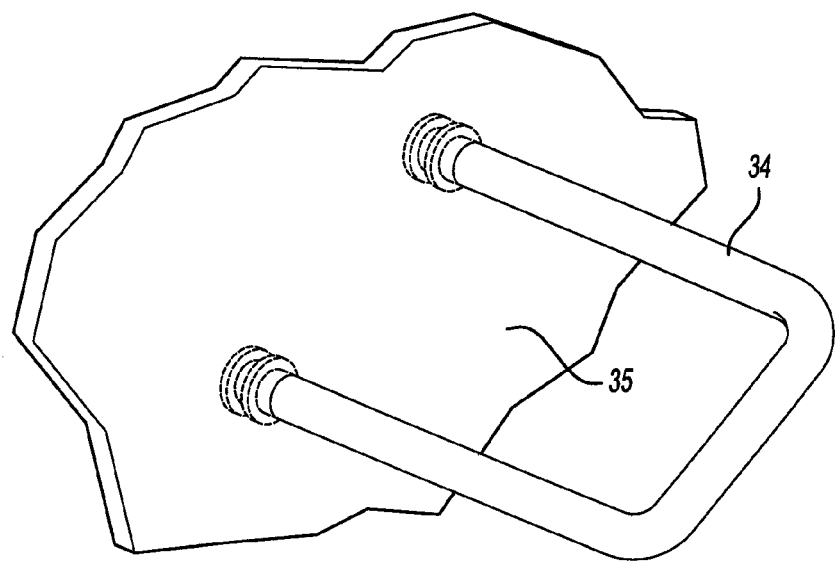
FIG. 4 is a fragmented perspective view of a striker member for docking with the portion of the vehicle seat assembly illustrated in FIG. 2.

Hook member 28 includes a first surface or ledge 40 and a second surface or ledge 42 as best shown in FIG. 4. When a downward force is applied to either of the first and second surfaces 40, 42, hook member 28 moves in a downward direction towards the unlatched position. Hook member 28 includes a protrusion 44 and a neck portion 46. Together, protrusion 44 and neck portion 46 form a slot 48 to receive striker member 34. When hook member 28 is in the latched position, a portion of striker member 34 is disposed in slot 48. When striker member 34 is disposed within slot 48, protrusion 44 and striker member 34 cooperate to prevent seat back 16 from moving toward the folded position. As hook member 28 moves toward the unlatched position, protrusion 44 moves in a downward direction with respect to striker member 34. Once protrusion 44 has moved to a position just below striker member 34, the latch assembly becomes disengaged from striker member 34 and seat back 16 is free to pivot to the folded position.

As illustrated in FIG. 2, first actuator 18 is disposed proximate first surface 40. First actuator 18 may be switch or lever or linkage or any other assembly that can apply a force in a generally downward direction on first surface 40. First actuator 18 may be mounted on seat frame 26, seat back 16, vehicle seat assembly 12 or vehicle 10.

Second actuator 20 is a lever that pivots around a portion of striker member 34 and is configured to apply a generally downward force on second surface 42 as second actuator 20 pivots in a counterclockwise direction. In other embodiments, second actuator 20 may be mounted to seat frame 26, seat back 16, vehicle seat assembly 12 or other portions of vehicle 10.

Spring 30 is connected, at a first end 50 to seat frame 26 and connected at a second end 52 to hook member 28. In the illustrated embodiment, hook member 28 has a spring notch 54 to receive second end 52 of spring 30. Seat frame 26 has a spring slot 56 to receive first end 50 of spring 30. Spring 30 has a first coil 58 and a second coil 60. In the illustrated embodiment, first coil 58 is coiled in a first direction and second coil 60 is coiled in a second direction. In other embodiments, a greater or lesser number of coils or no coils at all may be included in spring 30. In still other embodiments, the coils may be coiled in the same direction. When hook member 28 is in the latched position, the second coil 58 is pushed by striker member 34 towards a front portion of the seat frame 26, compressing the portion of spring 30 proximate coil 58. The compression of the portion of spring 30 proximate coil 58 causes a corresponding compression in second coil 60 which causes the second end 52 of spring 30 to urge hook member 28 in a generally upward direction which causes hook member 28 to remain in the latched position.

When hook member 28 is in the unlatched position, the first coil 58 is disposed proximate the rear portion of seat frame 26 and a portion of spring 30 proximate the first coil 58 is at least partially, but not completely, relaxed. Retaining some compression in coil 58 permits spring 30 to hold the various components of the latch system still, thus diminishing the likelihood that any of the components will rattle. In other embodiments, the portion of spring 30 proximate first coil 58 may be completely relaxed when hook member 28 is in the unlatched position. With first coil 58 disposed proximate the rear portion of seat frame 26, the portion of spring 30 proximate the second coil 60 is held in tension. This tension is transferred to hook member 28 through the second end 52 of spring 30 which urges hook member 28 towards the unlatched position.

Lever member 32 is mounted on seat frame 26 about pivot member 62. Pivot member 62 may be a threaded fastener or any other member effective to pivotally connect lever member 32 to seat frame 26. Pivot member 32 also serves as an anchor point for the second coil 60. Lever member 32 pivots between a forward position (see FIG. 2) and a rearward position (see FIG. 3). Lever member 32 forms a housing that at least partially covers spring 30 and which constrains spring 30 to ensure that spring 30 moves in a forward-rearward direction. A portion of lever member 32 is disposed adjacent inlet 27 and interfaces between spring 30 and striker member 34. As seat back 16 moves towards the upright position and the latch assembly begins to engage striker member 34, striker member 34 contacts lever member 32. Lever member 32 transfers the force applied by striker member 34 to spring 30.

Figure 5:
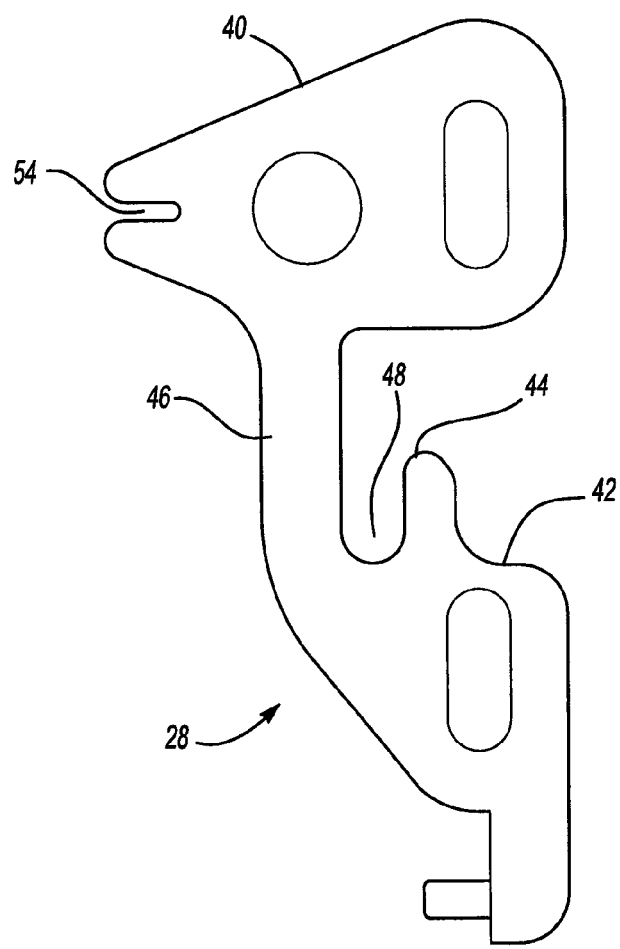
FIG. 5 is a side elevational view of a hook member for use with the vehicle seat assembly of FIG. 2.

FIG. 5 illustrates striker member 34. The striker member 34 has generally a U-shaped configuration. In other embodiments, striker member 34 may be a rod, a protrusion, or any other configuration which allows it to engage hook member 28. Striker member 34 is fixed to an internal portion 35 of vehicle 10. Having a U-shaped configuration permits striker member 34 to also serve as a pivot member for second actuator 20. In other embodiments, second actuator 20 may pivot about, or otherwise be attached to vehicle 10 at another location.

Figure 6:
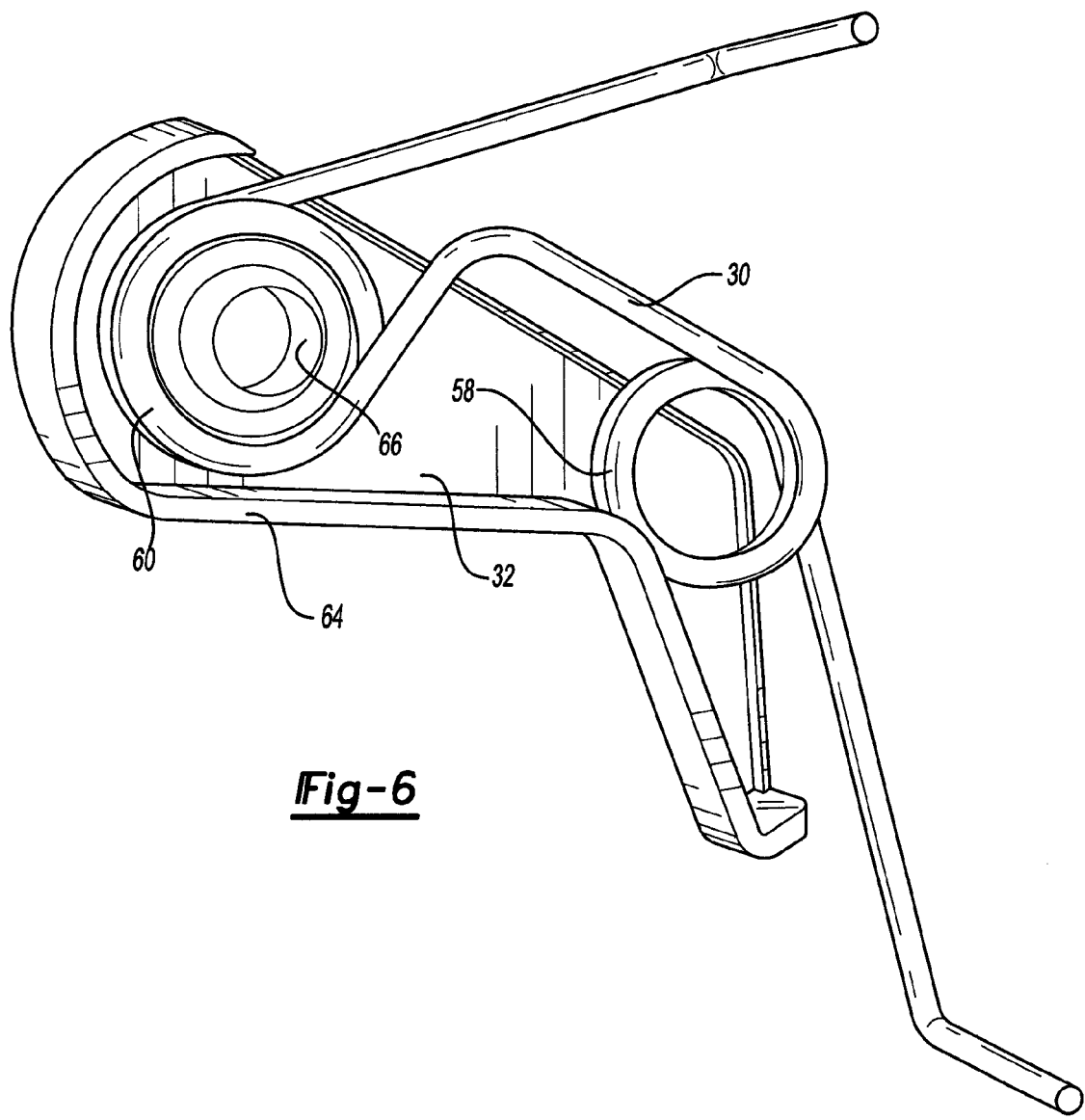
FIG. 6 illustrates a lever member and a spring for use with the vehicle seat assembly of FIG. 2.

FIG. 6 illustrates lever member 32 engaged with spring 30. In the illustrated embodiment, lever member 32 has an engagement wall 64 which engages striker member 34 and spring 30, providing a surface against which striker member 34 and spring 30 may act. Lever member 32 further includes pivot housing 66 which is configured to engage pivot member 62 and facilitate the pivoting of lever member 32 about pivot member 62.

In operation, a person desiring to lower seat back 16 into its folded position may do so either from in front of, or from a position rearward of, vehicle seat assembly 12. Once a user has actuated either the first actuator 18 or the second actuator 20, a downward force is transmitted to either the first or second ledges, respectively which, in turn, drives hook member 28 in a downward direction between first and second walls 36 and 38 of seat frame 26. Once protrusion 44 descends to a position below striker member 34, the latch assembly becomes disengaged from striker member 34 and seat frame 26 is free to pivot. In some embodiments, vehicle seat assembly 12 may include a spring motor or other mechanism which causes seat back 16 to pivot automatically to the folded position upon the disengagement of the latch assembly with the striker member 34. In other embodiments, a user may manually pivot seat back 16 towards the folded position.

As seat back 16 pivots forward and separates from striker member 34, the lever member 32 becomes free to pivot towards the rear portion of seat frame 26. Lever member 32 is urged towards the rear portion of seat frame 26 by spring 30 through contact with first coil 58. In some embodiments of vehicle seat assembly 12, a pivot stop (not shown) may be included to prevent lever member 32 from pivoting rearward beyond a predetermined point. As first coil 58 moves towards the rear portion of seat frame 26, the second end 52 of spring 30 urges hook member 28 in a downward direction. The hook member 28 remains in the unlatched position under the urging of spring 30.

As seat back 16 returns to the upright position, the striker member 34 is received within inlet 27. As seat frame 26 continues pivoting towards the upright position, striker member 34 strikes and drives lever member 32 towards the front portion of seat frame 26. As lever member 32 moves towards the front portion of seat frame 26, lever member 32 pushes on first coil 58. First coil 58 moves, in turn, in a generally forward and upward direction. As first coil 58 moves, it compresses the portion of spring 30 proximate second coil 60 which, in turn, causes second end 52 to urge the hook member 28 in an upward direction. Hook member 28 is at least partially prevented from moving in an upward direction until protrusion 44 clears the striker member 34. Once striker member 34 has entered slot 48, the hook member 28 is free to move in an upward direction in response to the force exerted by second end 52 of spring 30. The hook member 28 remains in the latched position under the urging of second end 52 of spring 30 and is retained in that position until either the first or second actuators 18, 20 are actuated, starting the cycle again.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat assembly configured to engage a striker member disposed on a vehicle, the vehicle seat assembly comprising:
    a seat frame, a portion of the seat frame being configured to move between a first seat position and a second seat position; and
    a hook member mounted directly to the seat frame, the hook member being configured for movement between a latched position and an unlatched position, the hook member engaging the striker member when the portion of the seat frame is in the first seat position and the hook member is in the latched position, the hook member and the striker member cooperating to restrain the portion of the seat frame in the first seat position when the hook member engages the striker member; and
    a spring supported on the seat frame, the spring having a first spring portion having a first coil that is coiled in a first direction and a second spring portion having a second coil that is coiled in a second direction, the spring urging the hook member to remain in the latched position when the hook member is in the latched position and the spring urging the hook member to remain in the unlatched position when the hook member is in the unlatched position,
    wherein the striker member flexes the first spring portion when the hook member engages the striker member, wherein the first spring portion is at least partially relaxed when the hook member is disengaged from the striker member, wherein the spring urges the hook member to remain in the latched position when the first spring portion is flexed, wherein the spring urges the hook member to remain in the unlatched position when the first spring portion is at least partially relaxed, and wherein the first spring portion biases the second spring portion in a first direction that causes the second spring portion to urge the hook member towards the latched position when the first spring portion is flexed.

2. The vehicle seat assembly of claim 1 further comprising a first actuator and a second actuator, the first actuator and the second actuator each being disposed proximate the hook member and each being configured to move the hook member from the latched position to the unlatched position, the first actuator being accessible from a position forward of the seat frame and the second actuator being accessible from a position rearward of the seat frame.

3. The vehicle seat assembly of claim 2 wherein the hook member includes a first surface and a second surface, the hook member moving from the latched position to the unlatched position when a force is applied to either the first surface or to the second surface or to a combination of the first and second surfaces, the first actuator configured to apply force to the first surface when actuated and the second actuator configured to apply force to the second surface when actuated.

4. The vehicle seat assembly of claim 3 wherein the second actuator is a release lever configured to move between a neutral position and an actuation position.

5. The vehicle seat assembly of claim 4 wherein the release lever is mounted to the striker member.

6. The vehicle seat assembly of claim 4 further comprising a linking member connected to the release lever, the linking member being configured to remotely move the release lever towards the actuation position when a force is applied to the linking member.

7. The vehicle seat assembly of claim 1 wherein the first spring portion biases the second spring portion in a second direction that causes the second spring portion to urge the hook member towards the unlatched position when the first spring portion is at least partially relaxed.

8. The vehicle seat assembly of claim 1 further comprising a lever member pivotally supported on the seat frame proximate the spring, the lever member being configured to move between a first lever member position and a second lever member position, the lever member being moved into the first lever member position by the striker member as the portion of the seat frame moves into the first seat position, the lever member causing the first portion of the spring to flex as the lever member moves into the first lever member position, the lever member being moved into the second lever member position by the first portion of the spring when the first portion of the spring is at least partially relaxed.

9. The vehicle seat assembly of claim 8 further comprising a pivot member attached to the seat frame, wherein the lever member is pivotally supported on the seat frame by the pivot member, and wherein the second coil is coiled around the pivot member.

10. A vehicle seat assembly configured to engage a striker member disposed on a vehicle, the vehicle seat assembly comprising:
a seat frame configured for connection to the vehicle, a portion of the seat frame being configured to move between a first seat position and a second seat position, the seat frame having a double wall construction including a first wall and a second wall;
a hook member mounted directly to the seat frame between the first wall and the second wall, the hook member having a protrusion and being configured for movement between a latched position and an unlatched position, the hook member engaging the striker member when the portion of the seat frame is in the first seat position and the hook member is in the latched position, the protrusion and the striker member cooperating to restrain the portion of the seat frame in the first seat position when the hook member engages the striker member, the hook member being disengaged from the striker member when the hook member is in the unlatched position, the hook member including a first ledge and a second ledge, the hook member moving from the latched position to the unlatched position when a force is applied to either the first ledge or to the second ledge or to a combination of the first and second ledges; and
a spring supported on the seat frame, the spring having a first spring portion having a first coil that is coiled in a first direction and a second spring portion having a second coil that is coiled in a second direction, the spring urging the hook member to remain in the latched position when the hook member is in the latched position and the spring urging the hook member to remain in the unlatched position when the hook member is in the unlatched position,
wherein the striker member flexes the first spring portion when the hook member engages the striker member, wherein the first spring portion is at least partially relaxed when the hook member is disengaged from the striker member, wherein the spring urges the hook member to remain in the latched position when the first spring portion is flexed, wherein the spring urges the hook member to remain in the unlatched position when the first spring portion is at least partially relaxed, and wherein the first spring portion biases the second spring portion in a first direction that causes the second spring portion to urge the hook member towards the latched position when the first spring portion is flexed.

11. The vehicle seat assembly of claim 10 further comprising a release lever attachable to the vehicle proximate the striker member, the release lever being configured to move between a neutral position and an actuation position wherein the release lever applies a force to the second ledge when the release lever moves to the actuation position.

12. The vehicle seat assembly of claim 11 further comprising a linking member connected to the release lever, the linking member including a cable to remotely move the release lever toward the actuation position when a force is applied to the linking member.

13. A vehicle seat assembly configured to engage a striker member disposed on a vehicle, the vehicle seat assembly comprising:
a seat frame configured for connection to the vehicle, a portion of the seat frame being configured to move between a first seat position and a second seat position, the seat frame having a double wall construction including a first wall and a second wall;
a hook member mounted directly to the seat frame between the first wall and the second wall, the hook member having a protrusion and being configured for movement between a latched position and an unlatched position, the hook member engaging the striker member when the portion of the seat frame is in the first seat position and the hook member is in the latched position, the protrusion and the striker member cooperating to restrain the portion of the seat frame in the first seat position when the hook member engages the striker member, the hook member being disengaged from the striker member when the hook member is in the unlatched position, the hook member including a first ledge and a second ledge, the hook member moving from the latched position to the unlatched position when a force is applied to at least one of the first and second ledges, the hook member being mounted to the seat frame such that the first ledge is accessible to a user from a position forward of the seat frame and the second ledge is accessible to a user from a position rearward of the seat frame; and
a spring supported on the seat frame and connected to the hook member, the spring urging the hook member to remain in the latched position when the hook member is in the latched position and the spring urging the hook member to remain in the unlatched position when the hook member is in the unlatched position, wherein the spring member includes a first spring portion and a second spring portion, wherein the first spring portion includes a first coil that is coiled in a first direction, wherein the second spring portion includes a second coil that is coiled in a second direction, wherein the striker member flexes the first spring portion when the hook member engages the striker member, wherein the first portion of the spring is at least partially relaxed when the hook member is disengaged from the striker member, wherein the spring urges the hook member to remain in the latched position when the first portion of the spring is flexed, wherein the spring urges the hook member to remain in the unlatched position when the first portion of the spring is at least partially relaxed, and wherein the first spring portion biases the second spring portion in a first direction that causes the second spring portion to urge the hook member towards the latched position when the first spring portion is flexed, and wherein the first spring portion biases the second spring portion in a second direction that causes the second spring portion to urge the hook member toward the unlatched position when the first spring portion is at least partially relaxed.

14. The vehicle seat assembly of claim 13 further comprising a pivot member attached to the seat frame and a lever member pivotally supported by the pivot member, the lever member being configured to move between a first lever member position and a second lever member position wherein the lever member is moved into the first lever member position by the striker member as the portion of the seat frame moves into the first seat position, wherein the lever member flexes the first portion of the spring as the lever member moves into the first lever member position, wherein the lever member is moved into the second lever member position by the spring when the first portion of the spring is at least partially relaxed and wherein the second coil is coiled around the pivot member and wherein the lever member contacts the first coil.

* * * * *